J. C. MacLACHLAN.
GRANULAR FOOD PRODUCT.
APPLICATION FILED MAR. 19, 1919.
1,394,035.
Patented Oct. 18, 1921.
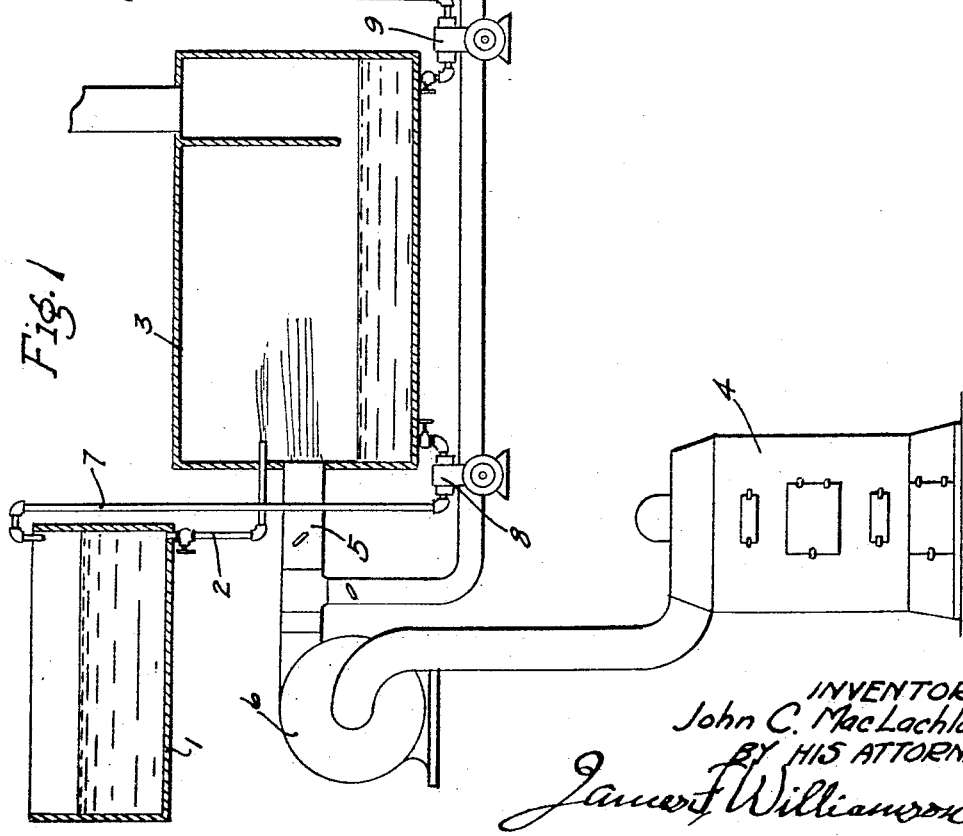
INVENTOR
John C. MacLachlan
BY HIS ATTORNEY
James F. Williamson

UNITED STATES PATENT OFFICE.

JOHN C. MacLACHLAN, OF ST. PAUL, MINNESOTA, ASSIGNOR TO STANDARD FOOD PRODUCTS COMPANY, OF ST. PAUL, MINNESOTA, A CORPORATION OF DELAWARE.

GRANULAR FOOD PRODUCT.

1,394,035. Specification of Letters Patent. Patented Oct. 18, 1921.

Original application filed August 21, 1916, Serial No. 115,997. Divided and this application filed March 19, 1919. Serial No. 283,545.

*To all whom it may concern:*

Be it known that I, JOHN C. MacLACHLAN, citizen of the United States, residing at St. Paul, in the county of Ramsey and State of Minnesota, have invented certain new and useful Improvements in Granular Food Products; and I do hereby declare the following to be a full, clear, and exact description of the invention, such as will enable others skilled in the art to which it appertains to make and use the same.

My invention provides an improved dry food product of granular form readily soluble in water, and the present application is filed as a division of my pending application S. N. 115,997, entitled "Method of desiccating fluid mixtures," filed of date, August 21st, 1916.

To obtain this improved food product, I may use the apparatus disclosed in my said prior application just identified, or may, and in practice do, employ the apparatus disclosed and claimed in my later pending application, S. N. 172,589, filed June 4th, 1917, and entitled "Apparatus for granulating semi-fluid materials."

In the accompanying drawings,

Figure 1 illustrates one form of apparatus which may be used to produce the product disclosed and claimed in this application, which process is similar to that disclosed in application, S. N. 115,997;

Fig. 2 represents the structure of the resulting product, the same being shown on a very greatly enlarged scale.

This improved granular food base or product is made from milk, cream, buttermilk, fruit, vegetables, and certain other materials, and is distinguished from finely powdered, somewhat similar products, by the important fact that it is of a granular formation readily soluble in water, and that the granules have a spongy, homogeneous character, each such granule consisting of a plurality of particles. Hitherto, liquids have been sprayed into a chamber containing hot air or hot drying medium, and have been dried in the form of a very fine powder, but so far as I am aware, I am the first to produce a granular product from semi-fluid or heavy pasty substances. The commercial advantages of the granular substance over the finely powdered substances, are very marked. The finely powdered substances when put in water, tend to produce a pasty or amorphous substance which will not readily dissolve, whereas the spongy granular particles of my improved product, will individually absorb the water and almost instantly dissolve, even in cold water.

When this product is produced by apparatus such as disclosed in my above identified applications, the substance to be granulated will first be reduced to a heavy liquid or semi-fluid or so-called pasty condition, and then the action of the so-called spraying-head will be thrown outward under the action of the centrifugal force, intercepted and beaten in the presence of a hot drying medium, with the result that it will be precipitated in the form of a dry granular product, of the character stated.

Referring to Fig. 1 of the drawings, an apparatus for carrying out the process is disclosed which comprises a receptacle 1, which is arranged to carry the material to be treated, which material is fed through a suitably valved conduit 2 into the treating or desiccating chamber 3. An air heating member or furnace 4 is disclosed through which is drawn air, which air is heated and drawn therethrough and discharged into chamber 3 through a pipe 5 by a blower 6. The material discharged from pipe 2 is treated by the heated air discharged from conduit 5. The material from chamber 3 is returned to chamber 1 through pipe 7 by means of a pump 8, and the treatment in chamber 3 continued until the proper spissitude is attained. The material then is by means of a pump 9 discharged through pipe 10 into the feeding conduit 11 from which it is discharged through the spraying head 11$^b$. The material is beaten up by the head 11$^b$ into particles of the desired size and heated air delivered by the fan casing 6 is passed therethrough by means of conduits 11, 12 and 13 which discharge into the second treating chamber 14. The air and moisture passes from the chamber 14 to the outlet 15, while the resulting product accumulates in the bottom of said chamber.

The material treated is first reduced to heavy liquid or semi-fluid state and to a pasty condition in chamber 3, and the material in this condition is then treated to form the dry granular product in the chamber 14. One process of producing the herein described product is fully described in application S. N. 115,997, of which, as stated above, this application is a division.

In Fig. 2 of the drawing, the structural character of one of the granules is indicated on a very greatly enlarged scale, and by reference to this drawing, it will be noted that each so-called granule A is made up of a multiplicity of quite loosely connected particles $a$, which give the granule a spongy, porous character, capable of quickly absorbing the water required for its dissolution.

What I claim is:—

A condensed food base made from milk, said base consisting of a multiplicity of granules which, in themselves, have an irregular formation and each of which consists of a plurality of loosely connected fine and small particles of irregular spongy character, the food base being thus readily soluble in water and having as an entirety a homogeneous open character.

In testimony whereof I affix my signature in presence of two witnesses.

JOHN C. MacLACHLAN.

Witnesses:
F. D. MERCHANT,
HARRY D. KILGORE.